United States Patent
Jokinen

(10) Patent No.: US 9,979,174 B2
(45) Date of Patent: May 22, 2018

(54) METHOD AND DEVICE FOR REMOVING MATERIAL FROM A POWER LINE WIRE

(71) Applicant: Global Boiler Works Oy, Oulu (FI)

(72) Inventor: Marko Petteri Jokinen, Oulu (FI)

(73) Assignee: Global Boiler Works OY, Oulu (FI)

( * ) Notice: Subject to any disclaimer, the term of this patent is extended or adjusted under 35 U.S.C. 154(b) by 546 days.

(21) Appl. No.: 14/429,111

(22) PCT Filed: Sep. 20, 2013

(86) PCT No.: PCT/FI2013/050908
§ 371 (c)(1),
(2) Date: Mar. 18, 2015

(87) PCT Pub. No.: WO2014/044915
PCT Pub. Date: Mar. 27, 2014

(65) Prior Publication Data
US 2015/0229114 A1 Aug. 13, 2015

(30) Foreign Application Priority Data
Sep. 20, 2012 (FI) ..................................... 20125976

(51) Int. Cl.
*H02G 7/16* (2006.01)
*B08B 7/02* (2006.01)
(52) U.S. Cl.
CPC ................ *H02G 7/16* (2013.01); *B08B 7/02* (2013.01)
(58) Field of Classification Search
None
See application file for complete search history.

(56) References Cited

U.S. PATENT DOCUMENTS

| 6,138,930 A | 10/2000 | Gagnon et al. |
| 6,660,934 B1 * | 12/2003 | Nourai ..................... H02G 7/16 |
| | | 174/40 R |
| 2004/0065458 A1 * | 4/2004 | Hansen .................... H02G 7/16 |
| | | 174/40 R |

FOREIGN PATENT DOCUMENTS

| CN | 101369722 A | 2/2009 |
| CN | 101572395 A | 4/2009 |

(Continued)

OTHER PUBLICATIONS

English Machine Translation of CN 102832584 A.*

(Continued)

*Primary Examiner* — Nicole Blan
(74) *Attorney, Agent, or Firm* — Andrus Intellecutal Property Law, LLP

(57) ABSTRACT

A travelling wave motion is formed in a power line wire, which wave motion loosens material, like snow or ice, on the surface of the wire. A first support point and a second support point are arranged on the wire course, the distance of which support points being substantially smaller than the distance between the adjacent support posts of the power line, and the course of the wire is changed on the part between the support points. Then the wire is suddenly returned into its original course, which evokes a longitudinal and/or transverse wave motion in the wire. The course of the wire can be changed by applying a force on the wire between the first and second support points, in a direction transverse to the longitudinal direction of the wire. Thus the wire is returned into its original course by suddenly removing the force applied into the wire. In implementing of the method can a device hung on a wire be used, which device comprises a flame, a first support roll, a second support roll and a transfer roll movable in relation to the support rolls.

20 Claims, 2 Drawing Sheets

(56) References Cited

FOREIGN PATENT DOCUMENTS

| | | | |
|---|---|---|---|
| CN | 102832584 A | * 12/2012 | |
| DE | 202005019422 | 6/2006 | |
| JP | 2004239037 A | 8/2004 | |
| SE | 503724 C2 | 8/1996 | |
| WO | WO-0148884 A1 | * 7/2001 | ............... H02G 7/16 |
| WO | 02084834 A1 | 10/2002 | |
| WO | 2012034124 A2 | 3/2012 | |

OTHER PUBLICATIONS

English Machine Transation of WO 01-4884 A1.*
English Machine Translation of CN 101572395 A.*
Supplementary European Search Report, EP Patent Application No. EP13838904, dated May 19, 2016.
International Search Report for FI20125976 dated Oct. 4, 2013.
International Search Report and Written Opinion for PCT/FI2013/050908 dated Jan. 22, 2014.

* cited by examiner

METHOD AND DEVICE FOR REMOVING MATERIAL FROM A POWER LINE WIRE

CROSS-REFERENCE TO RELATED APPLICATIONS

This application is the U.S. national stage application of International Application PCT/FI2013/050908, filed Sep. 20, 2013, which international application was published on Mar. 27, 2014, as International Publication WO2014/44915 in the English language. The international application is incorporated herein by reference, in entirety. The international application claims priority to Finnish Patent Application No. 20125976, filed Sep. 20, 2012, which is incorporated herein by reference, in entirety.

FIELD

The invention relates to a method for removing material from a surface of a power line wire, in which method a wave motion that travels along the wire is generated into the wire by applying an impulse into the wire. The invention further relates to a device used in the method.

BACKGROUND

During cold seasons snow and ice are accumulated on single wires of power lines. The accumulation of ice is particularly significant and rapid when supercooled water rains on the area of the power line. Ice and snow add the weight of the wires considerably, which can cause breakage of post mounting of the wires or even snapping of power line wires. To avoid such situations, the snow and ice accumulated on the power line wires must be removed periodically.

Publication WO 2012/034124 describes a method and arrangement for removing ice from power line wires by heating the wires with electric current. This, however, requires significant technical changes in the structures of power lines. Furthermore the removal of snow and ice from the wires by melting consumes a lot of electrical energy. Publication WO 02/084834 describes a method, in which snow and ice are removed from the wires mechanically, with flexible cables hanging from a helicopter and with an air stream created by the helicopter rotor. This kind of wire cleaning method is very expensive and also dangerous to realize. Publication JP 2004239037 describes a hammer attached onto a powerline, with which hammer a hit is applied onto the wire, to create a travelling wave motion that removes ice. Insulation on the wire surface complicates particularly the usage of hammers located on the power line posts.

The purpose of the invention is to introduce a method and a device for removing material, particularly snow and/or ice, attached on a power line wire, from the surface of the wire, with which method and device the disadvantages and drawbacks related to prior art can be reduced.

SUMMARY

The objects of the invention are achieved by a method and device, which are characterized by what is disclosed in the independent claims. In the dependent claims some preferred embodiments of the invention are disclosed.

The object of the invention is a method for removing material from a surface of a power line wire. The method is particularly suitable for removing snow and/or ice attached on the wire surface. In the method a wave motion travelling along the wire is generated into the wire by applying an impulse into the wire. The wave motion travelling along the wire makes the wire vibrate and the snow and ice attached on its surface are detached and fall down. On the area between the power line support posts the wires hang freely, being attached on the support posts at their ends. Then the wire is only loaded by its own weight and the material, like snow or ice, accumulated on the wire surface. The material is usually distributed evenly on the entire length of the wire. The course of the wires between adjacent support posts is then set into a form of an substantially parabolic arc.

In the method a first support point and a second support point are arranged on the course of the wire, the distance of which support points being substantially smaller than the distance between the adjacent support posts of the power line. Then the course of the wire is changed on the part between the first and the second support point. The changing of the course refers thus to forcing the wire between the first and the second support point into a form that differs from the original, freely hanging position of the wire. Finally the wire is suddenly returned into its original course. The returning is done by suddenly stopping the forcing of the wire into the changed form, thus causing the wire to immediately return to its original form by the effect of gravity. The abrupt returning of the wire into its original form functions as an impulse that creates a longitudinal and/or transverse wave motion into the wire. The wave motion travels from the starting point of the impulse, i.e. from between the first and second support point, to both directions and causes the material to loosen from the wire surface. Preferably the course of the wire is changed by directing a force into the wire between the first and second support points in a direction transverse to the longitudinal direction of the wire and by returning the wire into its original course by removing the force directed to the wire suddenly.

In a preferred embodiment of a method according to the invention the first and the second support point are arranged close to a midpoint of two adjacent support posts of the power line. The wave motion then travels in the wire from the midpoint of the support posts towards the support posts. The support points can be arranged very close to each other. The first and the second support point can be arranged into a distance of less than 2.0 meters, preferably less than 0.5 meters, most preferably less than 0.3 meters from each other. A relatively small change of only a few millimeters, in the course of the wire on the part between the first and the second support point, is sufficient for creating an impulse. The course can be changed for example 20 mm, preferably less than 10 mm, or even less than 5 mm. The extent of change in the wire course effects on the extent of the impulse and the wave motion created due to the impulse. Thus a wave motion of desired size can be created in the wire by adjusting the extent of change in the wire course. For example removing of dense and thin layer of ice requires a smaller impulse than removing of thick and rough layer of ice.

The device according to the invention for removing material, particularly snow and/or ice, form the surface of the power line wire comprises means for applying an impulse into the wire. The device comprises a frame, a first support roll and a second support roll, as well as a transfer roll. The first and second support roll are attached into the frame with a bearing at a distance from each other and the transfer roll can be moved in relation to the first and the second support rolls. The device further comprises a motor for moving the transfer roll. The device can preferably be hung on a power line wire such that the first support roll and the second support roll are placed on the first side of the wire and the transfer roll is placed on the second side of the wire, i.e. the wire travels between the support rolls and the transfer roll. The transfer roll can be placed above the wire and the support rolls below the wire, the entire device thus hanging from the wire by the transfer roll. Respectively the support rolls can be placed above the wire and the transfer roll below the wire, the device thus hanging from the wire by the support rolls. In resting position of the device, the wire travelling between the support rolls and the transfer roll is in its substantially parabolic form defined by gravity.

In a preferred embodiment of the device according to the invention the distance between the first support roll and the second support roll is less than 2.0 meters, preferably less than 0.5 meters, most preferably less than 0.3 meters. The distance between the support rolls defines the length of the device in the longitudinal direction of the wire. The device is thus very small by its dimensions, as viewed in the scale of the power line.

In another preferred embodiment of the device according to the invention the first transfer roll can be moved in a transverse direction of the line between the first and the second support rolls. As the device is activated for creating an impulse in the wire, the moving transfer roll forces the wire to change its course between the support rolls. As the motor moving the transfer roll is stopped, the transfer roll can return freely into its original position, thus causing the wire to immediately return into its original position due to the effect of gravity.

In a third preferred embodiment of the device according to the invention the said motor for moving the transfer roll is an electric motor and the device comprises a power source for arranging driving power to the motor. Preferably the device further comprises a battery for storing electrical energy.

Yet another preferred embodiment of the device according to the invention comprises a changer for producing charging current for the battery from a magnetic field created by the wire. With the charger the device receives required driving power straight from the wires. Thus the supply of electric current to the device does not need to be taken care of.

Yet another preferred embodiment of the device according to the invention comprises wireless control means for controlling the operation of the device. Wireless control can be implemented e.g. with control means operated by radio signals. The control means can operate in a short range radio communications network or in a long range radio communications network, like mobile telephone network.

Yet another preferred embodiment of the device according to the invention comprises a weatherproof, substantially closed casing. The closed casing can be spherical in form and its coloring can differ clearly from the surrounding. Thus the device hanging from the wires also functions as a sign warning the birds of the wires.

The invention has an advantage that it is simple, operationally reliable and technically easy to realize.

Additionally the invention has an advantage that it does not require any changes in the power line structures.

BRIEF DESCRIPTION OF THE DRAWINGS

In the following, the invention is explained in detail. In the description reference is made to the appended drawings in which.

DETAILED DESCRIPTION OF THE DRAWINGS

Figure 1A:
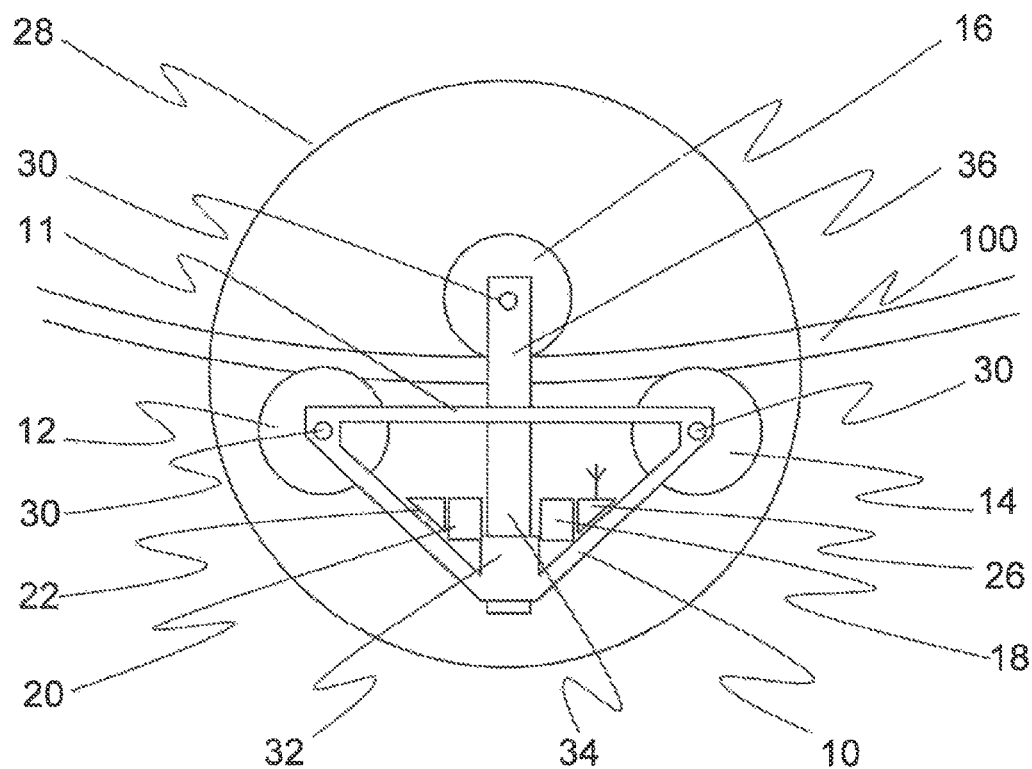
FIG. 1a shows, by way of example a device according to the invention in standby state in a side view.
Figure 1B:
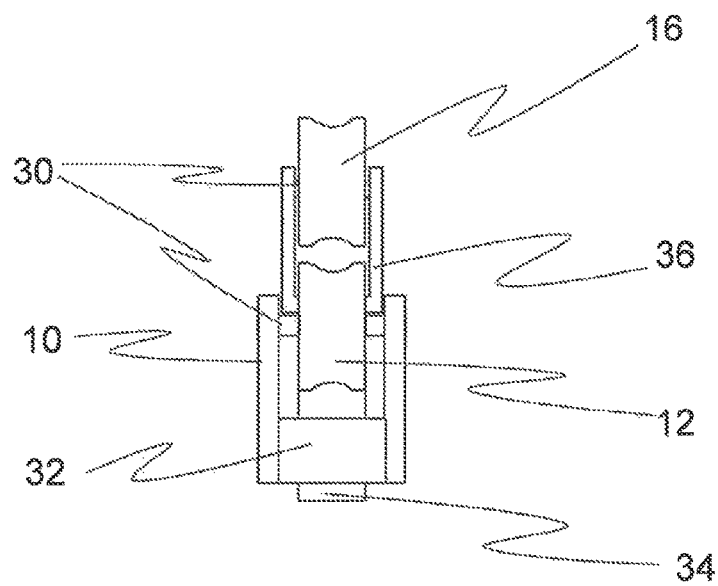
FIG. 1b shows an end view of the device of FIG. 1a, FIG. 2 shows the device of FIGS. 1a and 1b in a strained state.

FIG. 1a shows, by way of example, one device according to the invention, in a side view and in FIG. 1b the same device is shown in an end view. The device has an, in a side view substantially triangular, frame 10, constructed of metal pipe profiles, the frame having an upper side 11. On the first corner of the frame there is a first support roll 12 and on the second corner of the frame there is a second support roll 14. The support rolls are located on opposing ends of the upper side. The distance between the centres of support rolls can be selected in the manufacturing phase of the device according to what kind of an impulse is desired to be produced into the wire with the device. Suitable distance between the centres can thus be 0.3-2.0 m, depending on the device. The support rolls are attached into the frame with joint pins 30 and set freely rotating into the joint pins with bearings. In the third corner of the frame there is a sleeve 32 of square cross-section, inside of which sleeve the first end of the bar 34 is fitted movably. The bar is in substantially perpendicular position to the upper side 11. On the other end of the bar there is a support fork 36 (FIG. 1b), with two sides on a distance from each other. Support roll 16 is attached into the support fork with a joint pin 30, such that the first side of the support fork is on the first side of the transfer roll and the second side of the support fork is on the second side of the transfer roll. The support rolls and the transfer rolls are substantially of same size, having a groove going around their outer perimeter, into which groove the power line wire 100 can be fitted (FIG. 1b). The support rolls and the transfer roll can be of any durable enough material, like metal, plastic or composite material.

Inside the frame there is an electrically driven motor 18, that is connected to the bar 34 with a power transmission mechanism (the power transmission mechanism is not shown in the figures). The power transmission mechanism can comprise e.g. a gearwheel located in the motor and a toothed plate connector located in the bar, or some other suitable power transmission mechanism. Due to the power transmission mechanism the bar can be moved in the longitudinal direction of the bar by using the motor, causing the transfer roll 16 located on the one end of the bar to move in relation to support rolls 12, 14. Inside the frame there is also battery 20 and charger 22. The motor 18 is used with electrical energy stored in the battery. The charger 22 produces the charging current the battery requires. The charger functions by a magnetic field the wire 100 creates around itself. The device further comprises wireless control means 26 for controlling the use of the device, particularly motor 18. The control means can operate in a short range radio communications network or in a long range radio communications network, like mobile telephone network.

Figure 2:
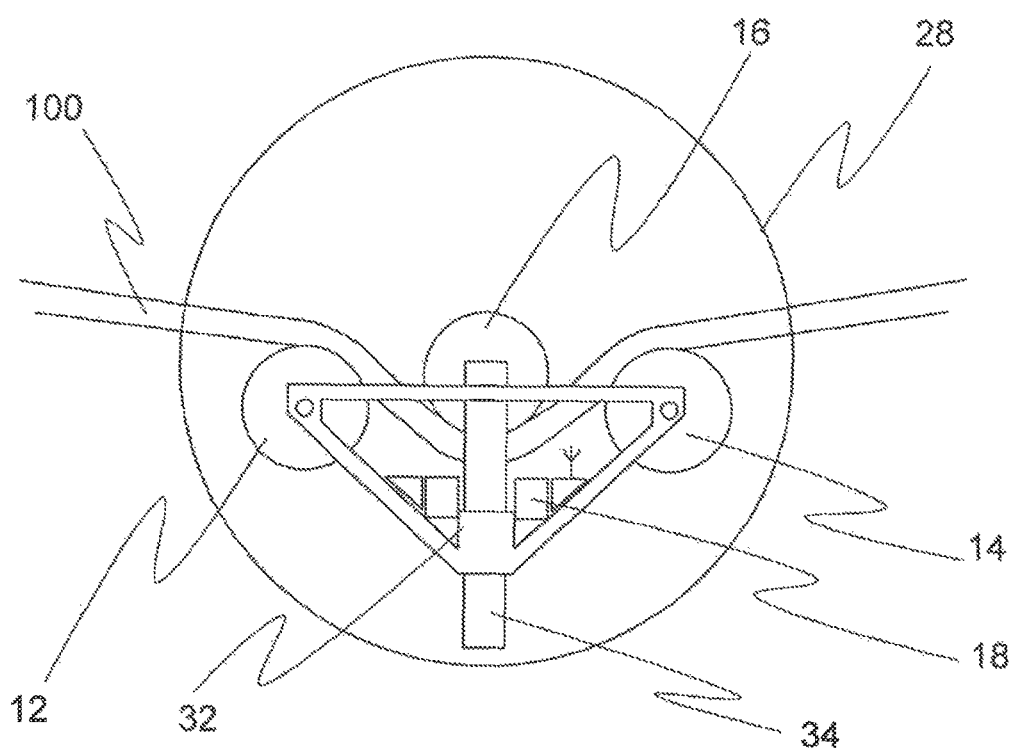

All above mentioned parts of the device are located inside a spherical, weatherproof casing 28 (the casing is not shown in FIG. 1b). The casing wall has holes for feed-through of wire 100. The coloring of the casing differs clearly from the surrounding, being e.g. red. Thus the device hanging from the wires also functions as a signal ball warning the birds of the wires. In FIGS. 1a and 2 the casing is shown transparent to highlight the device structure better. In FIG. 1b the casing is not shown.

In a usage situation the device is hung on a power line wire 100 such that the wire passes below the transfer roll 16 and above the support rolls 12, 14 i.e. the wire travels between the transfer roll and the support rolls. FIG. 1*a* shows the device in standby state, where the first end of bar 34 is mostly inside sleeve 32. In standby state of the device the support rolls and the transfer roll touch lightly the wire travelling between them, but they do not change the course of the wire. It is clear that the own weight of the device affects slightly the wire form. However, the own weight of the device is so small compared to the own weight of the wire, that is does not cause a significant change in the course of the wire.

In FIG. 2 the device of FIGS. 1*a* and 1*b* is shown in strained state. The device is strained when there is material like snow and/or ice that adds the weight of the wire, accumulated on the wire 100 and there is a desire to remove the material. In straining the bar 34 is moved by using the motor 18 such that the transfer roll 16 located on one end of the bar moves towards the sleeve 32. The transfer roll then bends the wire 100 into a curve on the part between the support rolls, i.e. it changes the course of the wire on the distance between the support rolls. In FIG. 2 the change in the course of the wire realized with the transfer roll and the support rolls is shown substantially exaggerated. In reality the magnitude of course change of the wire can be e.g. 5-20 mm.

The strained device is launched by returning the bar 34 and the transfer roll 16 located on the one end of it suddenly back into standby state shown in FIG. 1*a*. The returning can be done either by cutting off the power transmission connection between the motor and the bar momentarily or by placing the motor into free rotating position, causing the wire to immediately search its position defined by gravity, i.e. approximately into a form of parabolic arc, by the effect of gravity. The abrupt returning of the wire course functions as an impulse, which evokes a travelling wave motion in the wire. This wave motion probably comprises both longitudinal and transverse waves. The wave motion advancing in the wire causes the material on the wire surface to loosen from the wire, further causing it to fall to the ground.

Figure 3:
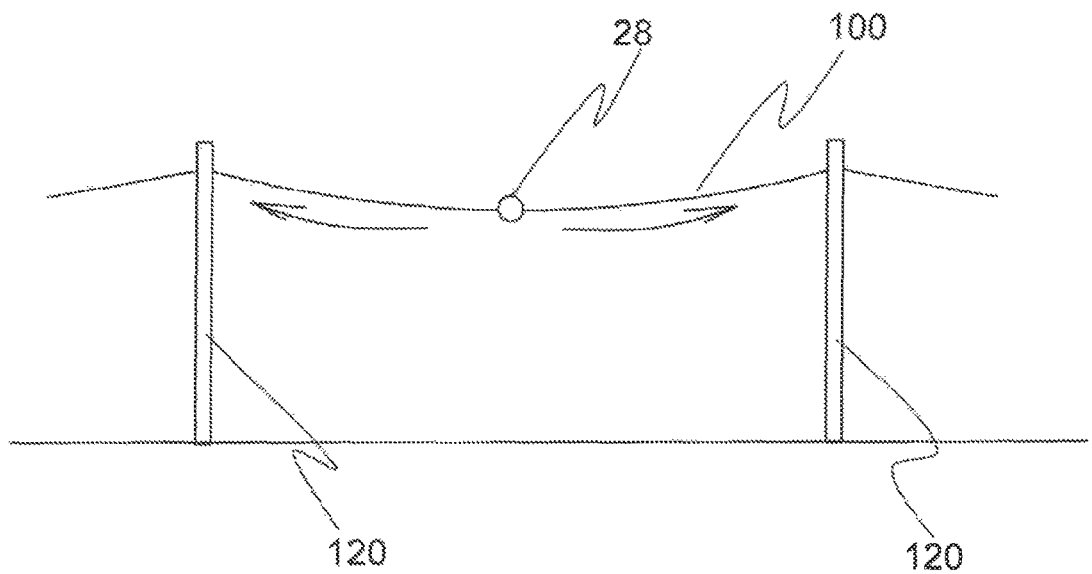
FIG. 3 shows, by way of example a part of a power line, with a device according to the invention in a wire.

FIG. 3 shows by way of example a part of the power line, with a device according to the invention on wire 100. The device is set hanging freely from a power line wire, thus automatically moving into the lowest point of the wire course, which lowest point usually is approximately in the middle of the power line support posts 120. The devices are installed into every wire of the power line between every adjacent support post. One device or several devices, as required, can be installed on a same wire part between adjacent support posts, on a distance from each other. The device is designed to be hung on the wires permanently, thus being ready for use always as a need arises. Typically in the weather conditions of northern countries snow and/or ice must be removed from the power line wires several times during winter, giving a good reason for hanging the device on the wires permanently. Due to the spherical casing of the device the device looks like an ordinary signal ball from the outside, facilitating the observation of the wires, due to which it does not change the appearance of the power line.

As material, like snow or ice, to be removed has accumulated on the wire surface, the device is given a control command with a radio signal. The device is strained and then launches automatically, creating a wave motion into the wire 100, the wave motion advancing away from device towards the support posts 120. The straining and launching can be repeated as many times as required to reach a desired result, i.e. the material loosening from the wire surface.

The device according to the invention can be equipped with a transfer motor rotating the transfer roll, which motor gets its driving power from the battery of the device and is controlled with wireless control means of the device. Device of this kind can be "driven" along the wire 100 next to a support post 120 for maintenance and eventual repairs of the device. There are several parallel wires in the power lines. Devices located between same support posts can be connected with a mechanical shaft, due to which an impulse produced by one device can be transmitted to all wires located between same support posts.

The foregoing describes some preferred, embodiments of the method and device according to the invention. The invention is not restricted to the solutions just described but the inventive idea is applicable in numerous ways within the scope of the claims.

The invention claimed is:

1. A method for removing material from a surface of a power line wire, in which method a wave motion travelling along the power line wire is created in the power line wire by applying an impulse thereto, comprising:
    arranging a first support point and a second support point on an original course of the power line wire supported between adjacent support posts projecting from a support surface, a distance between the first support point and the second support point being substantially smaller than a distance between the adjacent support posts supporting the power line;
    changing the original course of the power line wire on a part thereof between the first support point and the second support point when snow or ice is accumulated on the power line wire; and
    returning the power line wire into the original course resulting in the wave motion travelling in opposite directions along the power line wire to make the power line wire vibrate causing the removal of material therefrom.

2. The method according to claim 1, wherein the original course of the power line wire is changed by applying a force on the power line wire between the first support point and the second support point in a direction transverse to a longitudinal direction of the power line wire and by returning the power line wire into the original course by removing the force applied to the power line wire.

3. The method according to claim 1, wherein the first support point and the second support point are arranged close to a midpoint of two adjacent support posts supporting the power line wire.

4. The method according to claim 1, wherein the first support point and the second support point are arranged at a distance of less than 2.0 meters from each other.

5. The method according to claim 1, wherein the original course of the power line wire on the part between the first support point and the second support point is changed less than 20 mm.

6. The method according to claim 1, wherein the method is used for loosening snow and/or ice attached on the power line wire from the surface thereof.

7. The method according to claim 1, wherein the first support point and the second support point are fixed in use on opposite ends of the part of the power wire line.

8. The method according to claim 1, wherein the original course of the power line wire is changed by selectively controlling a force isolated on the part of the power line wire between the first support point and the second support point.

9. The method according to claim 8, wherein the power line wire is returned automatically to the original course by stopping the force isolated on the part of the power line wire.

10. A device for loosening snow and/or ice from a surface of a power line wire, the device comprising: a frame, a first support roll, a second support roll, wherein the first support roll and the second support roll are attached with a bearing into the frame at a distance from each other, and an arrangement configured to direct an impulse into the wire, wherein the device further comprises a transfer roll movable from an original position in relation to the first support roll and the second support roll, and a motor for moving the transfer roll when snow or ice is accumulated on the power line wire, wherein the transfer roll is movable in a transverse direction of the power line wire between the first support roll and the second support roll for changing an original course of the power line wire over a distance between the first support roll and the second support roll, wherein the transfer roll is returned into the original position to return the power line wire into the original course, the device being configured to provide a wave motion travelling in opposite directions along the power line wire to make the power line wire vibrate causing the loosening of snow and/or ice therefrom.

11. The device according to claim 10, wherein the device is hung on the power line wire such that the first support roll and the second support roll are placed on a first side of the power line wire and the transfer roll is placed on a second side of the power line wire.

12. The device according to claim 10, wherein the distance between the first support roll and the second support roll is less than 2.0 meters.

13. The device according to claim 10, wherein the motor for moving the transfer roll is an electric motor and the device comprises a power source for arranging driving power to the motor.

14. The device according to claim 10, wherein the device comprises a battery for storing electrical energy.

15. The device according to claim 14, wherein the device comprises a charger for producing charging current of the battery from a magnetic field created by the power line wire.

16. The device according to claim 10, wherein the device comprises wireless control to control the operation of the device.

17. The device according to claim 10, wherein the device comprises a weatherproof, substantially closed casing.

18. The device according to claim 10, wherein the transfer roll is drivingly connected to the motor to move the transfer roll in the transverse direction of the power line wire.

19. The device according to claim 10, wherein the transfer roll is connected to a bar which is movably mounted on the frame and configured to be drivingly connected to the motor.

20. The device according to claim 10, wherein the transfer roll is movable outside the frame.

\* \* \* \* \*